UNITED STATES PATENT OFFICE.

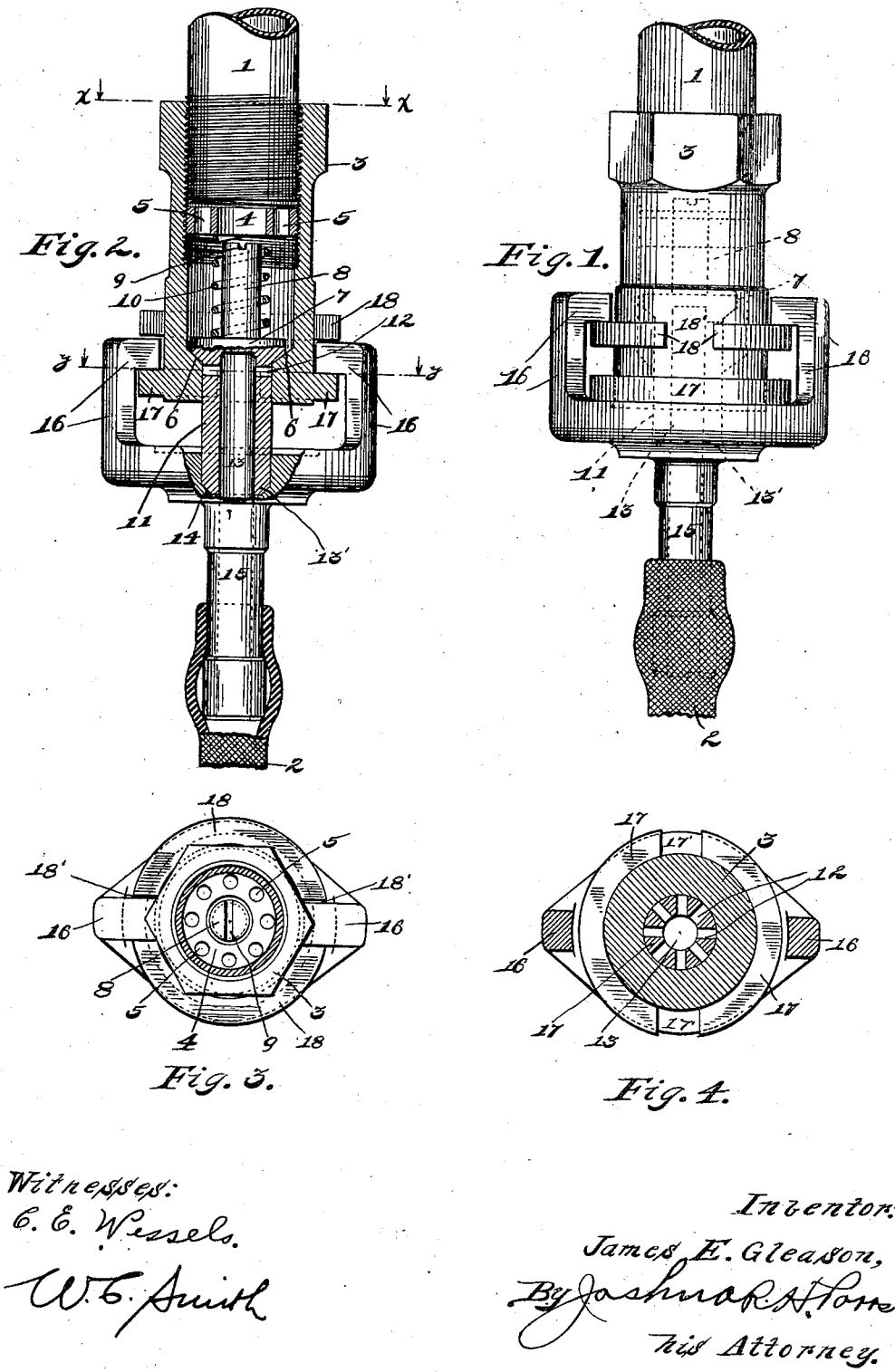

JAMES EDWARD GLEASON, OF LOCKPORT, ILLINOIS.

PNEUMATIC PIPE-COUPLING.

995,861. Specification of Letters Patent. Patented June 20, 1911.

Application filed September 21, 1910. Serial No. 583,122.

*To all whom it may concern:*

Be it known that I, JAMES E. GLEASON, a citizen of the United States, and a resident of the city of Lockport, county of Will, and State of Illinois, have invented certain new and useful Improvements in Pneumatic Pipe-Couplings, of which the following is a specification.

My invention relates to improvements in pneumatic pipe couplings and has for its object the production of an improved coupling provided with a valve adapted to close automatically when the pipe sections are uncoupled, and to be opened by the coupling of said sections.

A further object of my invention is to provide a pneumatic coupling of the character stated, which shall be simple of construction, inexpensive to manufacture, strong and durable, and efficient in operation.

Other objects will appear hereinafter.

With these objects in view my invention consists in the novel construction and arrangement of parts which will be hereinafter fully described and more particularly pointed out in the appended claims.

My invention will be more readily understood by reference to the accompanying drawings forming part of this specification and in which—

Figure 1 is a side elevation of my improved pneumatic pipe coupling in its preferred form, Fig. 2 is a sectional elevation thereof, and Figs. 3 and 4 are transverse sections taken on lines $x\,x$ and $y\,y$ respectively of Fig. 1.

The preferred construction for carrying my invention into effect as illustrated in the accompanying drawings, comprises a supply pipe 1 and a delivery hose 2, the latter being of any length to suit the purpose for which it is used. A pipe section 3 is internally threaded and screwed to supply pipe 1 as shown in Fig. 2, a perforated disk being screwed into said pipe section and arranged therein adjacent to pipe 1. The disk 4 is provided with a large central aperture and with a plurality of perforations 5 which serve to permit a free flow of fluid from the pipe 1 into the interior of the pipe section 3. Formed in the lower end of the pipe section is a valve seat 6 on which the valve 7 is normally seated as shown in Fig. 2. Extending upwardly from valve 7 and arranged in axial alinement therewith is a stem 8 provided at its upper extremity with a screwdriver slot 9. Said slot is provided in order that the valve 7 may be turned for grinding the same to fit in valve seat 6 as will be readily understood by those skilled in the art. Surrounding the stem 8 and adapted to maintain the valve 7 in a normally closed position is a helical spring 10, the same being interposed between the disk 4 and the valve 7. Integral with the valve 7 and extending downwardly therefrom is a cylindrical member 11; and formed therein in the upper portion thereof is a plurality of radial perforations 12 which lead from the interior of the pipe section 3 to the tubular opening 13 when the valve 7 is raised from its seat, thus forming a free passageway for fluid flowing downward from pipe 1. The lower end of the cylindrical member 11 is formed into the valve 13′ which is adapted to seat on valve seat 14 provided in pipe 15, the latter being arranged in axial alinement with the cylindrical member 11. Arranged diametrically opposite and extending laterally from pipe 15 is a pair of arms 16 having inwardly extending hooks at their upper extremities; said hooks are provided in order to detachably engage the pipe 15 with the pipe section 3, and in order to accomplish this a pair of adjacent circumferential flanges 17 and 18 are provided on the pipe section 3. The flanges 17 and 18 have diametrically opposite openings therein, the openings in one flange being spaced at 90 degrees from those in the other.

The operation of the device is as follows: In the normal position of the valve 7 as shown in Fig. 2 no fluid can escape from pipe section 3, and in order to raise said valve the pipe 15 must be raised from the position shown in Fig. 2 to that shown in Fig. 1. In attaching the pipe 15, engagement is first made with the valve 13′, then the hooks 16 pass through the openings 17′ in flange 17 to the position shown in Fig. 2; then the pipe 15 is rotated 90 degrees which will cause the hooks 16 to register with the openings 18′ in flange 18; the hooks 16 are now passed upwardly through the openings 18′ and rotated to a position as shown in Fig. 1. The foregoing movements cause the valve 7 to be raised from its seat and to permit air to flow from the interior of the pipe section 3 through the perforations 12 and into the tubular opening 13, whence the air will flow freely through the pipe 15 and into the hose 2.

It is obvious that the valve 7 will remain open as long as hooks 16 are in engagement with the flange 18, and that when said hooks are disengaged from said flange the said valve will immediately close; the object of the valve 13′ is to provide a sealed connection with the pipe 15 prior to the opening of the valve 7, thus forming a continuous conductor for air as it flows downwardly through the tubular opening 13.

A pipe coupling of the construction set forth is neat and compact in appearance and efficient in operation.

While I have shown what I deem to be the preferable form of my improved pipe coupling, I do not wish to be limited thereto as there might be various changes made in the arrangement of parts and details of construction, hence I desire to avail myself of such variations and modifications as will be comprehended in the scope of the appended claims.

Having described my invention what I deem as new and desire to secure by Letters Patent is:

1. A pneumatic pipe coupling comprising a pipe section, a pair of circumferential flanges provided in the periphery of said section adjacent the end thereof, each of said flanges having a pair of diametrically opposite openings, the openings in one flange being offset from those in the other, a pipe, a pair of diametrically opposite arms projecting laterally from said pipe, inwardly extending diametrically opposite hooks on said arms adapted to register with and to pass through said openings in said flanges successively, the spacing of said flanges being sufficient to permit a free passage of said hooks therebetween, a valve adapted to seat in said pipe when said hooks are positioned between said flanges, a second valve arranged in said pipe section and adapted to unseat when said hooks are locked on the flange most remote from the end of said pipe section, and means establishing communication between the latter and said pipe when said second valve is unseated, substantially as described.

2. In a pneumatic pipe coupling, a pipe section, a pair of circumferential flanges provided on the periphery of said pipe section adjacent to each other, each of said flanges having a pair of diametrically opposite openings, the openings in one flange being offset from those in the other, a pipe, a pair of diametrically opposite arms projecting laterally from said pipe, inwardly extending hooks formed on said arms and adapted to register with and to pass through said openings in said flanges, the spacing of said flanges being sufficient to permit of free passage of said hooks therebetween, a valve adapted to seat in said pipe when said hooks are positioned between said flanges, a second valve seated in said pipe section and adapted to unseat when said hooks are locked on the flange most remote from the end of said pipe section, and means for establishing communication between said pipe section and said pipe when the second valve is unseated, said valves being formed integral with each other, substantially as described.

3. A pneumatic pipe coupling comprising a pipe section, a pair of adjacent circumferential flanges provided on the periphery of said pipe section, there being diametrically opposite openings in said flanges, the openings of one flange being spaced 90 degrees to those in the other, a pipe, a hose connected to said pipe, a pair of diametrically opposite arms projecting laterally from said pipe, hooks on said arms adapted to register with and to pass through said openings in said flanges, said hooks being adapted to travel between said flanges from the openings in one flange to those in the other, a valve adapted to seat in said pipe when said hooks are engaged with said flange, a second valve arranged in said pipe section, and means of communication between said pipe section and said pipe when said second valve is open, substantially as described.

In testimony whereof I have signed my name to this specification in the presence of two subscribing witnesses.

JAMES EDWARD GLEASON.

Witnesses:
JOHN GLEASON,
MAURICE T. FLOUIN.

---

Copies of this patent may be obtained for five cents each, by addressing the "Commissioner of Patents, Washington, D. C."